United States Patent
Chen

(10) Patent No.: US 10,180,563 B2
(45) Date of Patent: Jan. 15, 2019

(54) OPTICAL LENS

(71) Applicant: ABILITY ENTERPRISE CO., LTD., New Taipei (TW)

(72) Inventor: Chia-Hung Chen, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 37 days.

(21) Appl. No.: 15/485,253

(22) Filed: Apr. 12, 2017

(65) Prior Publication Data
US 2017/0307858 A1    Oct. 26, 2017

(30) Foreign Application Priority Data

Apr. 20, 2016 (TW) .............................. 105112274 A

(51) Int. Cl.
| | | |
|---|---|---|
| *G02B 9/64* | (2006.01) | |
| *G02B 13/18* | (2006.01) | |
| *G02B 13/00* | (2006.01) | |
| *G02B 13/02* | (2006.01) | |

(52) U.S. Cl.
CPC .............. *G02B 13/18* (2013.01); *G02B 9/64* (2013.01); *G02B 13/006* (2013.01); *G02B 13/0045* (2013.01); *G02B 13/02* (2013.01)

(58) Field of Classification Search
CPC ................ G02B 13/18; G02B 13/0045; G02B 13/0015; G02B 13/002; G02B 9/64; G02B 9/00
USPC .......................................... 359/708, 691, 681
See application file for complete search history.

(56) References Cited

U.S. PATENT DOCUMENTS

| | | | | |
|---|---|---|---|---|
| 5,737,129 A * | 4/1998 | Ohtake | ................. | G02B 15/177 359/684 |
| 6,304,389 B1 * | 10/2001 | Shibayama | .......... | G02B 15/177 359/676 |
| 8,045,275 B2 * | 10/2011 | Park | ....................... | G02B 13/04 359/680 |
| 8,085,474 B2 * | 12/2011 | Wei | ....................... | G02B 15/177 359/676 |
| 8,724,232 B2 * | 5/2014 | Katsuragi | ............ | G02B 15/177 359/691 |
| 9,753,263 B2 * | 9/2017 | Yoo | ....................... | G02B 15/177 |
| 2003/0179466 A1 * | 9/2003 | Takatsuki | ............. | G02B 15/177 359/691 |
| 2006/0285230 A1 * | 12/2006 | Arakawa | ................ | G02B 13/24 359/770 |
| 2011/0205638 A1 * | 8/2011 | Wei | ....................... | G02B 15/177 359/691 |

(Continued)

*Primary Examiner* — William R Alexander
(74) *Attorney, Agent, or Firm* — McClure, Qualey & Rodack, LLP

(57) ABSTRACT

An optical lens is provided. The optical lens includes, in order from an object side to an image-forming side, a first lens having refractive power, a second lens having negative refractive power, a third lens having negative refractive power, a fourth lens having positive refractive power, a fifth lens having refractive power, a sixth lens having refractive power, a seventh lens having refractive power, an eighth lens having refractive power and a ninth lens having positive refractive power. The sixth lens, the seventh lens and the eighth lens constitute a composite lens, or the sixth lens and the seventh lens constitute a composite lens, or the seventh lens and the eighth lens constitute a composite lens.

20 Claims, 9 Drawing Sheets

(56) References Cited

U.S. PATENT DOCUMENTS

| | | | | |
|---|---|---|---|---|
| 2012/0050883 A1* | 3/2012 | Arai | ................... | G02B 15/177 |
| | | | | 359/680 |
| 2012/0243107 A1* | 9/2012 | Abe | ................... | G02B 15/177 |
| | | | | 359/680 |
| 2012/0314297 A1* | 12/2012 | Kim | ................... | G02B 15/177 |
| | | | | 359/683 |
| 2014/0198392 A1* | 7/2014 | Han | ................... | G02B 15/177 |
| | | | | 359/680 |
| 2015/0085376 A1* | 3/2015 | Katakura | ........... | A61B 1/00188 |
| | | | | 359/690 |
| 2016/0077314 A1* | 3/2016 | Nishimura | ............. | G02B 13/06 |
| | | | | 359/708 |
| 2016/0097919 A1* | 4/2016 | Su | ........................ | G02B 15/177 |
| | | | | 359/680 |
| 2016/0124181 A1* | 5/2016 | Noda | ................... | G02B 13/009 |
| | | | | 359/680 |
| 2017/0242220 A1* | 8/2017 | Lee | ........................ | G02B 13/06 |
| 2017/0293107 A1* | 10/2017 | Wang | ........................ | G02B 9/64 |
| 2017/0293118 A1* | 10/2017 | Huang | ................... | G02B 5/208 |

\* cited by examiner

| Lens | Surface number | Curvature radius (mm) | Thickness (mm) | Refractive index | Abbe number | Diameter (mm) | Conic constant |
|---|---|---|---|---|---|---|---|
| L1 | S1 | 12.63 | 1.51 | 1.8 | 33.3 | 14.4 | 0 |
|  | S2 | 19.22 | 0.10 |  |  | 13.5 | 0 |
| L2 | S3 | 12.20 | 1.47 | 1.9 | 35.9 | 12.0 | 0 |
|  | S4 | 3.68 | 1.92 |  |  | 7.0 | 0 |
| L3 | S5 | 16.70 | 0.70 | 1.5 | 81.6 | 7.0 | 0 |
|  | S6 | 2.79 | 3.47 |  |  | 5.7 | -0.29 |
| L4 | S7 | 8.89 | 1.88 | 1.8 | 47.2 | 6.2 | 0 |
|  | S8 | -9.65 | 2.45 |  |  | 6.0 | 0 |
| St | St | ∞ | 0.1 |  |  | 2.8 | 0 |
| L5 | S9 | -90.43 | 1.00 | 1.8 | 46.5 | 2.9 | 0 |
|  | S10 | -7.29 | 0.05 |  |  | 3.2 | 0 |
| L6 | S11 | 24.62 | 1.40 | 1.6 | 71.2 | 3.3 | 0 |
|  | S12 | -2.91 | 0.00 |  |  | 3.5 | 0 |
| L7 | S13 | -2.91 | 0.72 | 1.8 | 35.5 | 3.5 | 0 |
|  | S14 | 5.07 | 0.00 |  |  | 4.0 | 0 |
| L8 | S15 | 5.07 | 1.70 | 1.5 | 81.6 | 4.0 | 0 |
|  | S16 | -6.98 | 2.65 |  |  | 4.6 | 0 |
| L9 | S17 | 9.97 | 1.58 | 1.6 | 67.0 | 7.1 | 0 |
|  | S18 | -256.60 | 1.50 |  |  | 7.2 | 0 |
| F | S19 | ∞ | 0.3 | 1.5 | 64.2 | 7.5 | 0 |
|  | S20 | ∞ | 0.4 |  |  | 7.6 | 0 |
| C | S21 | ∞ | 0.5 | 1.5 | 64.2 | 7.6 | 0 |
|  | S22 | ∞ | 0.53 |  |  | 7.7 | 0 |
|  | I | ∞ | 0.00 |  |  | 7.8 | 0 |

FIG. 3A

|  | K | A4 | A6 | A8 | A10 | A12 | A14 | A16 |
|---|---|---|---|---|---|---|---|---|
| S5 | 0.00E+00 | 9.32E-03 | -1.32E-03 | 1.19E-04 | -5.71E-06 | 7.82E-08 | 3.28E-09 | 0.00E+00 |
| S6 | 0.00E+00 | 1.10E-02 | -1.72E-03 | 1.47E-04 | -2.35E-05 | 2.05E-06 | -9.79E-08 | 0.00E+00 |

FIG. 3B

| Lens | Surface number | Curvature radius (mm) | Thickness (mm) | Refractive index | Abbe number | Diameter (mm) | Conic constant |
|---|---|---|---|---|---|---|---|
| L1 | S1 | 17.75203 | 1.517151 | 1.8 | 33 | 15.62088 | 0 |
|  | S2 | 24.20398 | 0.09884148 |  |  | 14.37129 | 0 |
| L2 | S3 | 10.13817 | 1.498904 | 1.9 | 36 | 11.70426 | 0 |
|  | S4 | 3.596839 | 1.962545 |  |  | 6.93112 | 0 |
| L3 | S5 | 16.39434 | 0.676731 | 1.5 | 81.5 | 6.904937 | -0.6795476 |
|  | S6 | 2.772831 | 3.242238 |  |  | 5.797108 | -0.289151 |
| L4 | S7 | 9.362101 | 2.165702 | 1.7 | 47 | 6.314458 | 0 |
|  | S8 | -8.898307 | 2.444128 |  |  | 6.147108 | 0 |
| St | St | ∞ | 0.1 |  |  | 2.923214 | 0 |
| L5 | S9 | -64.07756 | 0.9195138 | 1.8 | 46.5 | 2.936438 | 0 |
|  | S10 | -7.221776 | 0.1485128 |  |  | 3.020802 | 0 |
| L6 | S11 | 23.37583 | 1.354109 | 1.5 | 71 | 3.032725 | 0 |
|  | S12 | -2.978008 | 0 |  |  | 3.012779 | 0 |
| L7 | S13 | -2.978008 | 0.6077042 | 1.8 | 35.5 | 3 | 0 |
|  | S14 | 5.044402 | 0.3 |  |  | 3.337922 | 0 |
| L8 | S15 | 5.4 | 2 | 1.5 | 81 | 5.28966 | 0 |
|  | S16 | -6.836381 | 2.729206 |  |  | 5.592455 | 0 |
| L9 | S17 | 10.3513 | 1.562958 | 1.6 | 67 | 6.527182 | 0 |
|  | S18 | -304.3213 | 1.496893 |  |  | 6.5 | 0 |
| F | S19 | ∞ | 0.3 | 1.5 | 64 | 6.842476 | 0 |
|  | S20 | ∞ | 0.4 |  |  | 6.967214 | 0 |
| C | S21 | ∞ | 0.5 | 1.5 | 64 | 7.228761 | 0 |
|  | S22 | ∞ | 0.53 |  |  | 7.436658 | 0 |
|  | I | ∞ | 0.00 |  |  | 7.783208 | 0 |

FIG. 6A

|  | K | A4 | A6 | A8 | A10 | A12 | A14 | A16 |
|---|---|---|---|---|---|---|---|---|
| S5 | 0 | 0.0090635 | 0.001334 | 0.0001199 | -5.83E-06 | 7.06E-08 | 3.80E-09 | 0 |
| S6 | 0 | 1.08E-02 | -1.75E-03 | 1.44E-04 | -2.40E-05 | 2.12E-06 | -1.02E-07 | 0 |

FIG. 6B

| Lens | Surface number | Curvature radius (mm) | Thickness (mm) | Refractive index | Abbe number | Diameter (mm) | Conic constant |
|---|---|---|---|---|---|---|---|
| L1 | S1 | 19.9 | 4.3 | 1.8 | 33.3 | 28 | 0 |
| | S2 | 25.4 | 0.4 | | | 24.6 | 0 |
| L2 | S3 | 22.0 | 3.1 | 1.9 | 35.3 | 23.1 | 0 |
| | S4 | 7.9 | 2.5 | | | 14.3 | 0 |
| L3 | S5 | 13.7 | 1.8 | 1.5 | 81.6 | 14.0 | -0.07 |
| | S6 | 4.4 | 8.4 | | | 10.4 | -0.44 |
| L4 | S7 | 22.5 | 2.5 | 1.8 | 42.7 | 9.5 | 0 |
| | S8 | -21.9 | 2.3 | | | 9.0 | 0 |
| St | St | ∞ | 0.2 | | | 6.0 | 0 |
| L5 | S9 | -118.2 | 1.9 | 1.6 | 67.0 | 6.1 | 0 |
| | S10 | -13.2 | 1.1 | | | 6.7 | 0 |
| L6 | S11 | 49.1 | 2.4 | 1.6 | 67.0 | 7.2 | 0 |
| | S12 | -6.7 | 0.0 | | | 7.4 | 0 |
| L7 | S13 | -6.7 | 0.6 | 1.8 | 37.2 | 7.4 | 0 |
| | S14 | 10.4 | 0.0 | | | 8.3 | 0 |
| L8 | S15 | 10.4 | 3.3 | 1.5 | 81.6 | 8.3 | 0 |
| | S16 | -12.3 | 4.2 | | | 9.3 | 0 |
| L9 | S17 | 20.1 | 4.7 | 1.6 | 67.0 | 13.1 | -11.04 |
| | S18 | -222.0 | 5.7 | | | 14.6 | 79.48 |
| F | S19 | ∞ | 0.3 | 1.5 | 64.2 | 15.7 | 0 |
| | S20 | ∞ | 0.4 | | | 15.8 | 0 |
| C | S21 | ∞ | 0.5 | 1.5 | 64.2 | 15.9 | 0 |
| | S22 | ∞ | 0.53 | | | 15.9 | 0 |
| | I | ∞ | 0.00 | | | 16.0 | 0 |

FIG. 8A

| | K2 | K4 | K6 | K8 | K10 | K12 | K14 | K16 |
|---|---|---|---|---|---|---|---|---|
| S5 | 0 | 8.81E-4 | -3.28E-5 | 6.67E-7 | -8.83E-9 | 3.37E-11 | 7.21E-13 | -7.41E-15 |
| S6 | 0 | 1.30E-3 | -4.89E-5 | 4.76E-7 | -3.47E-8 | 7.21E-10 | -3.20E-12 | -4.42E-13 |
| S17 | 0 | -8.60E-6 | -9.87E-7 | -5.45E-8 | 4.38E-10 | 8.20E-12 | -6.96E-14 | -1.43E-15 |
| S18 | 0 | -6.23E-5 | -1.45E-6 | -3.27E-8 | 1.63E-10 | 5.10E-12 | -2.04E-14 | -5.07E-16 |

FIG. 8B

|  | Optical lens OL1 | Optical lens OL2 | Optical lens OL3 |
|---|---|---|---|
| F | 3.8 | 3.87 | 8.5 |
| TTL | 26 | 26.5 | 52 |
| F/TTL | 0.15 | 0.15 | 0.164 |
| Y | 3.9 | 3.9 | 8 |
| F/Y | 0.97 | 0.99 | 1.063 |
| FNO | 2.8 | 2.8 | 2.6 |
| FOV | 95 | 90 | 100 |
| (FNO×TTL)/(FOV×Y) | 0.196 | 0.211 | 0.169 |
| R1 | 12.63 | 17.75 | 19.9 |
| R2 | 19.22 | 24.2 | 25.4 |
| |R2/R1| | 1.522 | 1.363 | 1.276 |
| R4 | 3.68 | 3.6 | 7.9 |
| Φ4 | 7 | 6.93 | 14.3 |
| Φ4/R4 | 1.9 | 1.925 | 1.81 |
| d | 2.55 | 2.55 | 2.5 |
| d/F | 0.67 | 0.66 | 0.29 |
| D | 3.6 | 3.25 | 14.6 |
| D/Y | 0.92 | 0.83 | 1.83 |

FIG. 9

OPTICAL LENS

This application claims the benefit of Taiwan application Serial No. 105112274, filed Apr. 20, 2016, the subject matter of which is incorporated herein by reference.

BACKGROUND OF THE INVENTION

Field of the Invention

The invention relates to an optical lens, and more particularly to an optical lens which is light and thin, wide in viewing angle and excellent in imaging quality.

Description of the Related Art

Since outdoor sports image capturing devices have risen and the need for an unmanned aerial vehicle and a lens having wide angle has increased in recent years, the thickness of the optical lens has become thin according. Therefore, such type of lens is aimed to be light and thin, wide in viewing angle and excellent in imaging quality.

Therefore, to meet the requirement for a wide-angle lens nowadays having high image performance, it is in need to provide a novel optical lens to realize an optical lens having improved imaging quality and wide angle at the same time.

SUMMARY OF THE INVENTION

The invention relates to an optical lens which may achieves a light and thin optical lens, wide angle and improved imaging quality at the same time.

According to one embodiment the present invention, an optical lens is provided. The optical lens includes a first lens group having refractive power and a second lens group having positive refractive power. The first lens group, in order from an object side to an image-forming side, at least includes a first lens having positive refractive power, a second lens having negative refractive power, a third lens having negative refractive power and a fourth lens having positive refractive power. The second lens group includes a plurality of lenses, wherein a lens closest to the image-forming side has positive refractive power.

According to another embodiment the present invention, an optical lens is provided. The optical lens includes a first lens group having refractive power and a second lens group having positive refractive power. The first lens group, in order from an object side to an image-forming side, at least includes a first lens having positive refractive power, a second lens having negative refractive power, a third lens having negative refractive power and a fourth lens having positive refractive power. The second lens group includes a plurality of lenses, wherein a lens closest to the image-forming side is a biconvex lens.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3A lists each lens parameter of the optical lens of FIG. 1.

FIG. 3B lists coefficients of the mathematic equation of the aspheric surfaces of the optical lens of FIG. 1.

FIG. 6A lists each lens parameter of the optical lens of FIG. 2.

FIG. 6B lists coefficients of the mathematic equation of the aspheric surfaces of the optical lens of FIG. 2.

FIG. 8A lists each lens parameter of the optical lens of FIG. 7.

FIG. 8B lists coefficients of the mathematic equation of the aspheric surfaces of the optical lens of FIG. 7.

FIG. 9 lists optical information of the optical lenses of FIGS. 3A, 3B, 6A, 6B, 8A and 8B.

DETAILED DESCRIPTION OF THE INVENTION

Figure 1:
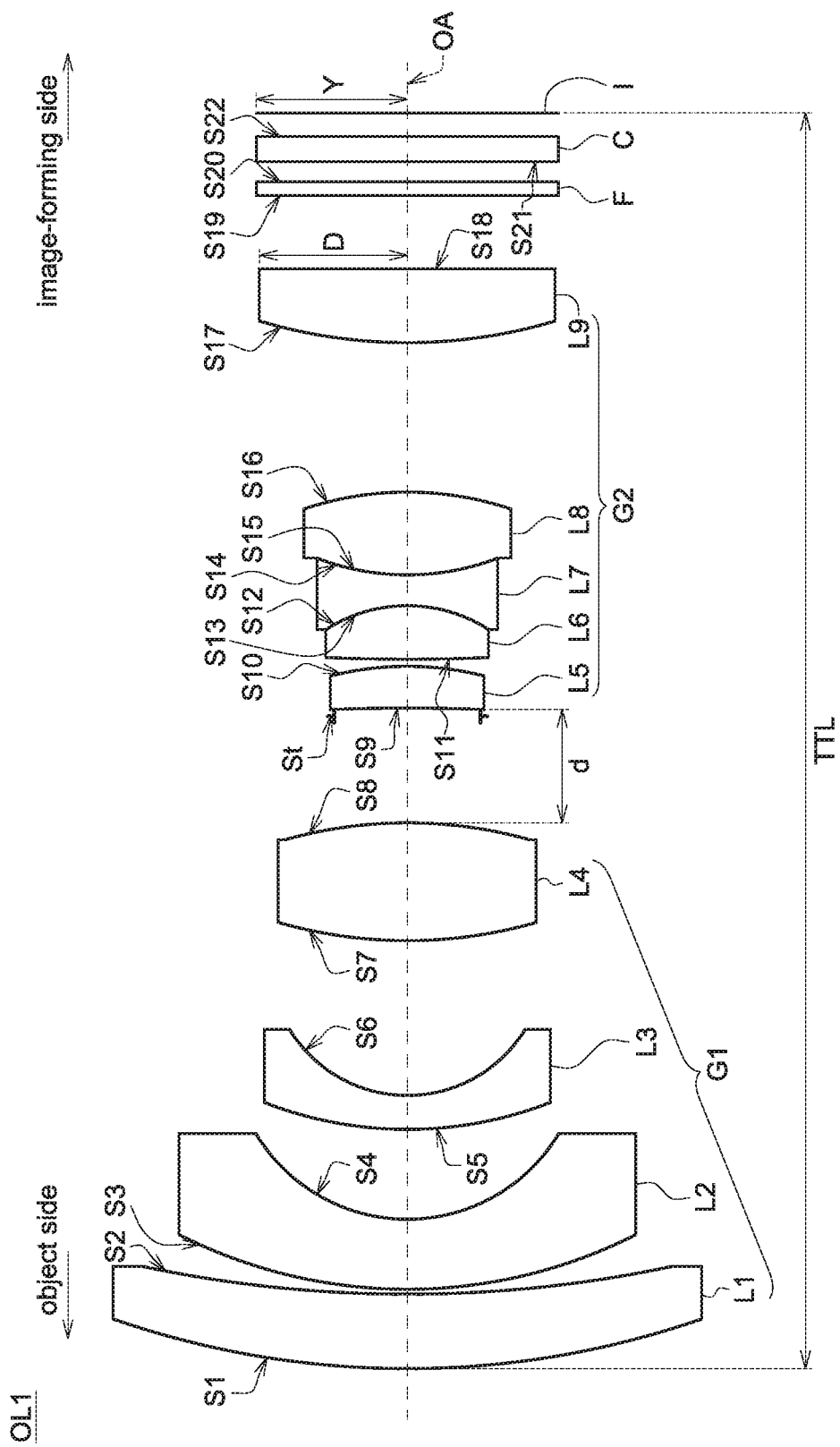
FIG. 1 shows an optical lens according to one embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

Figure 2:
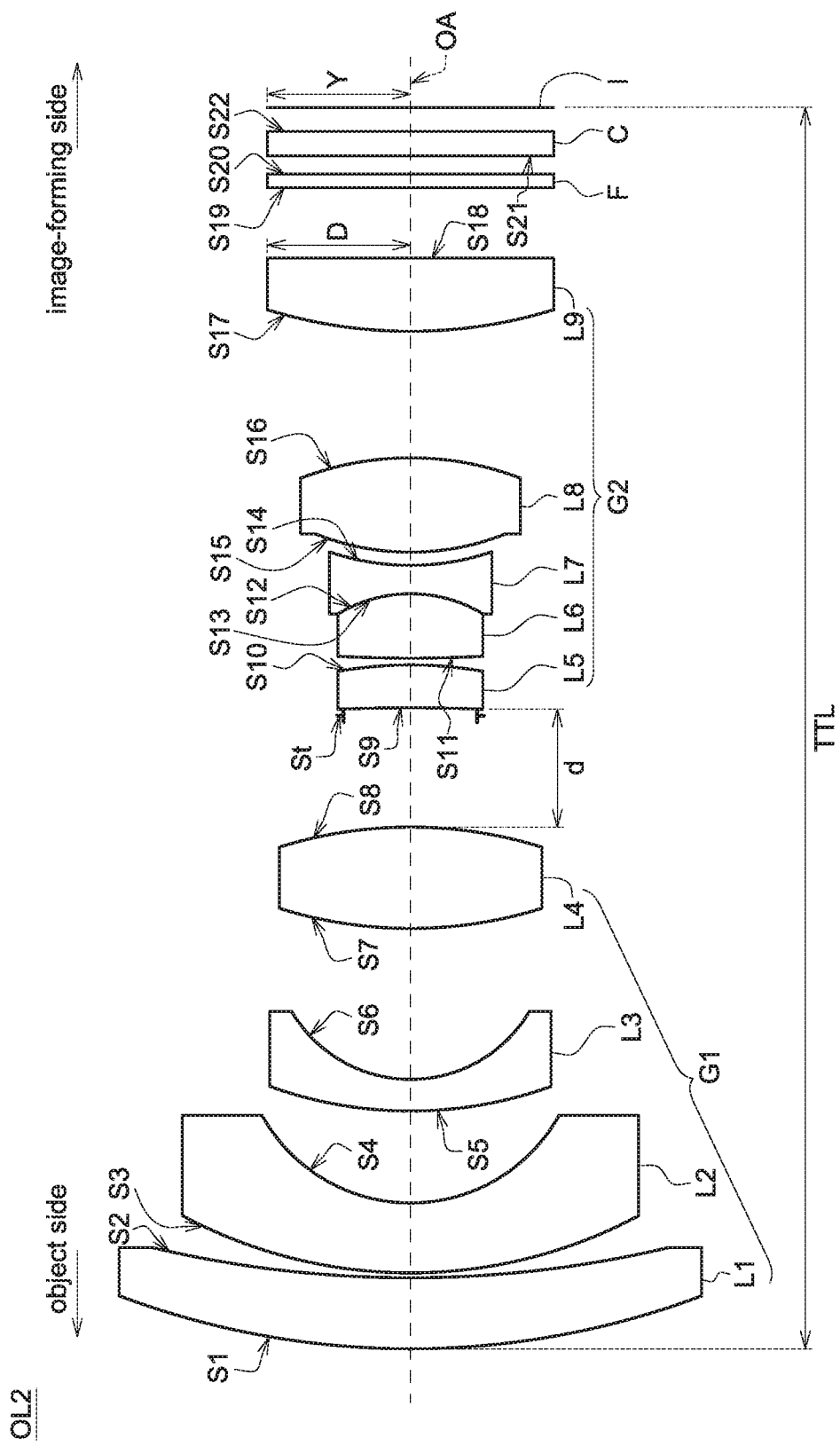
FIG. 2 shows an optical lens according to another embodiment of the present invention.

FIG. 1 shows an optical lens OL1 according to one embodiment of the present invention. FIG. 2 shows an optical lens OL2 according to one embodiment of the present invention. To highlight the features of the present embodiment, the drawings merely show components related to this embodiment, and the irrelevant or minor components are omitted. The optical lens OL1, OL2 may be a wide-angle lens, and may be employed in a device capable of projecting or capturing images, wherein the device may be but not limited to a hand-held communication system, an unmanned aerial vehicle, a sports camera lens, a monitoring system, a digital camera, a digital camcorder or a projector.

In one embodiment, the optical lens OL1, OL2, in order from an object side to an image-forming side, may include a first lens group G1 and a second lens group G2. The first lens group G1 has refractive power, such as positive refractive power or negative refractive power, and includes a plurality of lens. The second lens group G2 has positive refractive power, and includes a composite lens and a plurality of lens. The first lens group G1 may include four or more than four lenses. The composite lens may be composed of two or more than two lenses, but the present invention is not limited thereto.

In one embodiment, the first lens group G1 includes four lenses, two of which have positive refractive power while the other two of which have negative refractive power. In another embodiment, the second lens group G2 includes at least five lenses, one of which has negative refractive power while the others may have positive refractive power.

Referring to FIGS. 1 and 2, the first lens group G1, in order from the object side to the image-forming side, includes a first lens L1, a second lens L2, a third lens L3 and a fourth lens L4. The second lens group G2, in order from the object side to the image-forming side, includes a fifth lens L5, a sixth lens L6, a seventh lens L7, an eighth lens L8 and a ninth lens L9.

Specifically, the first lens L1 may have positive refractive power, the second lens L2 may have negative refractive power, the third lens L3 may have negative refractive power, the fourth lens L4 may have positive refractive power, the fifth lens L5 may have refractive power (such as positive refractive power or negative refractive power), the sixth lens L6 may have refractive power (such as positive refractive power or negative refractive power), the seventh lens L7 may have refractive power (such as negative refractive power or positive refractive power), the eighth lens L8 may have refractive power (such as positive refractive power or negative refractive power), and the ninth lens L9 may have positive refractive power.

In one embodiment, the fifth lens L5 and the ninth lens L9 both have positive refractive power, while one of the sixth lens L6, the seventh lens L7 and the eighth lens L8 has negative refractive power, and the others may have positive refractive power. For example, the sixth lens L6, the seventh lens L7 and the eighth lens L8 may respectively have positive, negative and positive refractive power, but the present is not limited thereto. The sixth lens L6, the seventh lens L7 and the eighth lens L8 may respectively have negative, positive and positive refractive power as well, or may respectively have positive, positive and negative.

In addition, as shown in FIG. 1, the sixth lens L6, the seventh lens L7 and the eighth lens L8 may constitute a composite lens (not indicated). Or, as shown in FIG. 2, the sixth lens L6 and the seventh lens L7 may constitute the composite lens (not indicated). Furthermore, in another embodiment, it may be the seventh lens L7 and the eighth lens L8 to constitute the composite lens as well. The composite lens may have negative refractive power.

In one embodiment, the fourth lens L4 has an Abbe number V4, and V4 may satisfy at least one of the following conditions: $35 \leq V4$, $40 \leq V4$, $V4 \leq 47.2$, $V4 \leq 55$, $V4 \leq 60$, $35 \leq V4 \leq 47.2$, $40 \leq V4 \leq 47.2$, $35 \leq V4 \leq 55$, $40 \leq V4 \leq 55$, $35 \leq V4 \leq 60$ and $40 \leq V4 \leq 60$.

As shown in FIGS. 1 and 2, the fourth lens L4 is the lens closest to the image-forming side among the first lens group G1, but the present invention is not limited thereto. In another embodiment, there may further be one or more than one lens having refractive power (not shown) between the fourth lens L4 and the fifth lens L5. In such a condition, V4 may be an Abbe number of the fourth lens L4, but may also be an Abbe number of any lens between the fourth lens L4 and the fifth lens L5, or an Abbe number of the lens closest to the image-forming side among the first lens group G1.

In one embodiment, the ninth lens L9 has an Abbe number V9, and V9 may satisfy at least one of the following conditions: $50 \leq V9$, $60 \leq V9$, $65 \leq V9$, $V9 \leq 70$, $V9 \leq 75$, $V9 \leq 85$, $50 \leq V9 \leq 67$, $60 \leq V9 \leq 67$, $65 \leq V9 \leq 67$, $50 \leq V9 \leq 70$, $60 \leq V9 \leq 70$, $65 \leq V9 \leq 70$, $67 \leq V9 \leq 70$, $50 \leq V9 \leq 75$, $60 \leq V9 \leq 75$, $65 \leq V9 \leq 75$, $67 \leq V9 \leq 75$, $50 \leq V9 \leq 5$, $60 \leq V9 \leq 85$, $65 \leq V9 \leq 85$ and $67 \leq V9 \leq 85$.

As shown in FIGS. 1 and 2, the ninth lens L9 is the lens closest to the image-forming side among the second lens group G2, but the present invention is not limited thereto. In another embodiment, there may further be one or more than one lens having refractive power (not shown) between the ninth lens L9 and an imaging plane I. In such a condition, V9 may be an Abbe number of the ninth lens L9, but may also be an Abbe number of any lens between the ninth lens L9 and the imaging plane I, or an Abbe number of the lens closest to the image-forming side among the second lens group G2.

The optical lens OL1, OL2 may further include a focal length F and a length TTL. In one embodiment, the optical lens OL1, OL2 may satisfy at least one of the following conditions: $0 \leq F/TTL$, $0.05 \leq F/TTL$, $0.1 \leq F/TTL$, $F/TTL \leq 0.2$, $F/TTL \leq 0.25$, $0 \leq F/TTL \leq 0.25$, $0 \leq F/TTL \leq 0.2$, $0 \leq F/TTL \leq 0.17$, $0.05 \leq F/TTL \leq 0.25$, $0.05 \leq F/TTL \leq 0.2$, $0.05 \leq F/TTL \leq 0.17$, $0.1 \leq F/TTL \leq 0.25$, $0.1 \leq F/TTL \leq 0.2$, $0.1 \leq F/TTL \leq 0.17$, $0.145 \leq F/TTL \leq 0.25$ and $0.145 \leq F/TTL \leq 0.2$. The length TTL may be a distance between the imaging plane I and an object-side surface of the lens of the optical lens OL1, OL2 closest to the object side. Specifically, the length TTL may be a distance from an object-side surface of the first lens group G1 to the imaging plane I on an optical axis OA of the optical lens OL1, OL2. Or, the length TTL is a distance from an object-side surface S1 of the first lens L1 to the imaging plane I.

The optical lens OL1, OL2 may further include an image height Y. In one embodiment, the optical lens OL1, OL2 may satisfy at least one of the following conditions: $0.8 \leq F/Y$, $0.85 \leq F/Y$, $0.9 \leq F/Y$, $0.97 \leq F/Y$, $F/Y \leq 1.065$, $F/Y \leq 1.075$, $F/Y \leq 1.15$, $F/Y \leq 1.2$, $0.8 \leq F/Y \leq 1.065$, $0.8 \leq F/Y \leq 1.075$, $0.8 \leq F/Y \leq 1.15$, $0.8 \leq F/Y \leq 1.2$, $0.85 \leq F/Y \leq 1.065$, $0.85 \leq F/Y \leq 1.075$, $0.85 \leq F/Y \leq 1.15$, $0.85 \leq F/Y \leq 1.2$, $0.9 \leq F/Y \leq 1.065$, $0.9 \leq F/Y \leq 1.075$, $0.9 \leq F/Y \leq 1.15$, $0.9 \leq F/Y \leq 1.2$, $0.97 \leq F/Y \leq 1.065$, $0.97 \leq F/Y \leq 1.075$, $0.97 \leq F/Y \leq 1.15$ and $0.97 \leq F/Y \leq 1.2$.

In one embodiment, the optical lens OL1, OL2 may further satisfy at least one of the following conditions: $0.15 \leq d/F$, $0.2 \leq d/F$, $0.25 \leq d/F$, $d/F \leq 0.67$, $d/F \leq 0.75$, $d/F \leq 0.85$, $0.15 \leq d/F \leq 0.67$, $0.15 \leq d/F \leq 0.75$, $0.15 \leq d/F \leq 0.85$, $0.2 \leq d/F \leq 0.67$, $0.2 \leq d/F \leq 0.75$, $0.2 \leq d/F \leq 0.85$, $0.25 \leq d/F \leq 0.67$, $0.25 \leq d/F \leq 0.75$ and $0.25 \leq d/F \leq 0.85$. d may be a distance between the fourth lens L4 and the second lens group G2. For example, d is a distance between the first lens group G1 and the second lens group G2; or, d is a distance between an image-side surface of the fourth lens L4 and an object-side surface of the fifth lens L5.

The optical lens OL1, OL2 may further have a field of view FOV. In one embodiment, the optical lens OL1, OL2 may satisfy at least one of the following conditions: $70° \leq FOV$, $90° \leq FOV$, $FOV \leq 95°$, $FOV \leq 115°$, $70° \leq FOV \leq 95°$, $70° \leq FOV \leq 115°$, $90° \leq FOV \leq 95°$ and $90° \leq FOV \leq 115°$.

The optical lens OL1, OL2 may further include an aperture FNO. In one embodiment, the optical lens OL1, OL2 may satisfy at least one of the following conditions: $0 \leq (FNO \times TTL)/(FOV \times Y)$, $0.1 \leq (FNO \times TTL)/(FOV \times Y)$, $0.15 \leq (FNO \times TTL)/(FOV \times Y)$, $0.16 \leq (FNO \times TTL)/(FOV \times Y)$, $(FNO \times TTL)/(FOV \times Y) \leq 0.211$, $(FNO \times TTL)/(FOV \times Y) \leq 0.3$, $(FNO \times TTL)/(FOV \times Y) \leq 0.4$, $0 \leq (FNO \times TTL)/(FOV \times Y) \leq 0.211$, $0 \leq (FNO \times TTL)/(FOV \times Y) \leq 0.3$, $0 \leq (FNO \times TTL)/(FOV \times Y) \leq 0.4$, $0.1 \leq (FNO \times TTL)/(FOV \times Y) \leq 0.211$, $0.1 \leq (FNO \times TTL)/(FOV \times Y) \leq 0.3$, $0.1 \leq (FNO \times TTL)/(FOV \times Y) \leq 0.4$, $0.15 \leq (FNO \times TTL)/(FOV \times Y) \leq 0.211$, $0.15 \leq (FNO \times TTL)/(FOV \times Y) \leq 0.3$, $0.15 \leq (FNO \times TTL)/(FOV \times Y) \leq 0.4$, $0.16 \leq (FNO \times TTL)/(FOV \times Y) \leq 0.211$, $0.16 \leq (FNO \times TTL)/(FOV \times Y) \leq 0.3$ and $0.16 \leq (FNO \times TTL)/(FOV \times Y) \leq 0.4$.

The object-side surface S1 of the first lens L1 may have a first curvature radius R1, and the image-side surface S2 of the first lens L1 may have a second curvature radius R2. In one embodiment, the optical lens OL1, OL2 may satisfy at least one of the following conditions: 0.8≤|R2/R1|, 1≤|R2/R1|, 1.2≤|R2/R1|≤1.55, |R2/R1|≤1.55, |R2/R1|≤2, 0.8≤|R2/R1|≤1.55, 0.8≤|R2/R1|≤2, 1≤|R2/R1|≤1.55, 1≤|R2/R1|≤2, 1.2≤|R2/R1|≤1.55 and 1.2≤|R2/R1|≤2.

The image-side surface S4 of the second lens L2 may have a fourth curvature radius R4 and an optical effective diameter Φ4. In one embodiment, the optical lens OL1, OL2 may satisfy at least one of the following conditions: 1.6≤Φ4/R4, 1.7≤Φ4/R4, 1.8≤Φ4/R4, Φ4/R4≤1.925, Φ4/R4≤1.93, Φ4/R4≤1.95 and Φ4/R4≤2. The optical effective diameter Φ4 may also be a diameter of the image-side surface S4 of the second lens L2.

Furthermore, in one embodiment, the optical lens OL1, OL2 may satisfy at least one of the following conditions: 0.6≤D/Y, 0.7≤D/Y, 0.8≤D/Y, D/Y≤1.85, D/Y≤2, D/Y≤2.2, 0.6≤D/Y≤1.85, 0.6≤D/Y≤2, 0.6≤D/Y≤2.2, 0.7≤D/Y≤1.85, 0.7≤D/Y≤2, 0.7≤D/Y≤2.2, 0.8≤D/Y≤1.85, 0.8≤D/Y≤2 and 0.8≤D/Y≤2.2. D may be an effective diameter of the ninth lens L9, including but not limited to an optical effective diameter, a physical effective diameter or an outer diameter.

Specifically, the ninth lens L9 is the lens closest to the image-forming side among the second lens group G2, but the present invention is not limited thereto. In another embodiment, there may further be one or more than one lens having refractive power (not shown) between the ninth lens L9 and the imaging plane I. D may be an effective diameter of the ninth lens L9, but may also be an effective diameter of any lens between the ninth lens L9 and the imaging plane I, or may be an effective diameter of the lens closest to the image-forming side among the second lens group G2.

In addition, the first lens L1 has an Abbe number V1 and a refractive index N1, the second lens L2 has an Abbe number V2 and a refractive index N2, the third lens L3 has an Abbe number V3 and a refractive index N3, the fourth lens L4 has an Abbe number V4 and a refractive index N4, the fifth lens L5 has an Abbe number V5 and a refractive index N5, the sixth lens L6 has an Abbe number V6 and a refractive index N6, the seventh lens L7 has an Abbe number V7 and a refractive index N7, the eight lens L8 has an Abbe number V8 and a refractive index N8, and the ninth lens L9 has an Abbe number V9 and a refractive index N9. In one embodiment, the optical lens OL1, OL2 may satisfy at least one of the following conditions: N1−N3≥0.1, N1−N3>0, N2−N3≥0.1, N2−N3>0, N4−N3≥0.1, N4−N3>0, N7−N8≥0.1, N7−N8>0, N7−N6≥0.1, N7−N6>0, N7−N5≥0, N5−N6≥0, N9−N8≥0.1, N9−N8>0, V2−V1≥0.1, V2−V1>0, V3−V1≥10, V3−V1>5, V3−V4≥10, V3−V4>5, V8−V9≥10, V8−V9>5, V8−V7≥0, V8−V7>5, V8−V6≥10, V8−V6>5、V8−V5≥10, V8−V5>5, V6−V7≥10, V6−V7>5 and V6−V5≥0.

Furthermore, in one embodiment, the first lens L1, the second lens L2, the third lens L3, the fourth lens L4, the fifth lens L5, the sixth lens L6, the seventh lens L7, the eighth lens L8 and the ninth lens L9 may all be a glass lens made of glass material. In another embodiment, at least one of the second lens L2, the third lens L3, the fourth lens L4, the fifth lens L5 and the ninth lens L9 may be a plastic lens made of plastic material. The plastic material may include, but not limited to, polycarbonate, cyclic olefin copolymer (e.g. APEL), polyester resins (e.g. OKP4 or OKP4HT), and the like, or may be mixture material and/or compound material including at least one of the above-mentioned material.

In one embodiment, the first lens L1, the second lens L2, the third lens L3, the fourth lens L4, the fifth lens L5, the sixth lens L6, the seventh lens L7, the eighth lens L8 and the ninth lens L9 may respectively be a spherical lens, a free-form lens or an aspheric lens. For example, the first lens L1, the second lens L2, the fourth lens L4, the fifth lens L5, the sixth lens L6, the seventh lens L7, the eighth lens L8 and the ninth lens L9 may be spherical lenses; the third lens L3 may be the aspheric lens or the free-form lens. Or, the first lens L1, the second lens L2, the fourth lens L4, the fifth lens L5, the sixth lens L6, the seventh lens L7 and the eighth lens L8 may be spherical lenses; and the third lens L3 and the ninth lens L9 may respectively be the aspheric lens(es) and/or the free-form lens(es).

Specifically, each of the free-form lenses has at least one free-form surface; that is, an object-side surface and/or an image-side surface of the free-form lens are/is the free-form surface(s). Each of the aspheric lenses has at least one aspheric surface; that is, an object-side surface and/or an image-side surface of the aspheric lens are/is the aspheric surface(s). And, each of the aspheric surfaces satisfies the following mathematic equation:

$$Z = \left[ \frac{(C*Y^2)}{1+\sqrt{1-(K+1)C^2Y^2}} \right] + \Sigma(A_i * Y^i)$$

where Z is the coordinate along the optical axis OA direction, and the direction in which light propagates is designated as positive; A4, A6, A8, A10, A12, A14, and A16 are aspheric coefficients; K is coefficient of quadratic surface; C is reciprocal of R (C=1/R); R is the curvature radius; Y is the coordinate in a direction perpendicular to the optical axis OA, in which the upward direction away from the optical axis OA is designated as positive. In addition, each of the parameters or the coefficients of the mathematic equation of each of the aspheric surfaces may be independent of one another.

As shown in FIG. 1, the object-side surface S1 of the first lens L1, the object-side surface S3 of the second lens L2 and the object-side surface S5 of the third lens L3 may all have positive refractive rates and may respectively be a convex surface toward the object side. The image-side surfaces S2, S4 and S6 may all have positive refractive rates and may respectively be a concave surface toward the object side. Furthermore, the first lens L1, the second lens L2 and the third lens L3 may respectively be a lens having refractive power, including but not limited to a convex-concave plastic/glass lens having positive refractive power, or a convex-concave plastic/glass lens having negative refractive power. For example, the first lens L1 may be a convex-concave glass lens having positive refractive power, the second lens L2 and the third lens L3 may respectively be a convex-concave plastic/glass lens having negative refractive power. In addition, the object-side surfaces S1, S3 and the image-side surfaces S2, S4 may respectively be a spherical surface; or, at least one of the surfaces S1, S2, S3 and S4 is an aspheric surface and/or a free-form surface. The object-side surface S5 and the image-side surface S6 may respectively be the aspheric surface(s) and/or the free-form surface(s).

Next, the fourth lens L4, the sixth lens L6, the eighth lens L8 and the ninth lens L9 may respectively be a lens having refractive power. The object-side surface S7, S11, S15 and S17 of the fourth lens L4, the sixth lens L6, the eighth lens L8 and the ninth lens L9 may all have positive refractive rates and may respectively be a convex surface toward the object side; the image-side surfaces S8, S12, S16 and S18 may all have negative refractive rates and may respectively be a convex surface toward the image-forming side. In other words, the fourth lens L4, the sixth lens L6, the eighth lens L8 and the ninth lens L9 may respectively be a biconvex lens having positive refractive power, but the present invention is not limited thereto.

In another embodiment, the sixth lens L6 and the eighth lens L8 may respectively be a concave-convex lens or a convex-concave lens having positive or negative refractive power. For example, the fourth lens L4 and the ninth lens L9 may respectively be a biconvex glass lens or a biconvex plastic lens having positive refractive power. The sixth lens L6 and the eighth lens L8 may respectively be a biconvex glass lens, a concave-convex glass lens or a convex-concave glass lens having positive refractive power, or a concave-convex glass lens or a convex-concave glass lens having negative refractive power. Moreover, the object-side surfaces S7, S11, S15 and S17 and the image-side surfaces S8, S12, S16 and S18 may all be spherical surfaces, or at least one of the surfaces S7, S8, S11, S12, S15, S16, S17 and S18 is an aspheric surface or a free-form surface.

Moreover, the object-side surface S9 of the fifth lens L5 may have negative refractive rate and may be a concave surface toward the image-forming side; the image-side surface S10 may have negative refractive rate and may be a convex surface toward the image-forming side. Furthermore, the fifth lens L5 may be a lens having positive refractive power or negative refractive power including but not limited to a concave-convex plastic lens or a concave-convex glass lens. In addition, the object-side surface S9 and the image-side surface S10 may respectively be a spherical surface, an aspheric surface or a free-form surface.

Furthermore, the object-side surface S13 of the seventh lens L7 may have negative refractive rate and may be a concave surface toward the image-forming side; the image-side surface S14 may have positive refractive rate and may be a concave surface toward the object side. In another embodiment, the seventh lens L7 may be a lens having negative refractive power or positive refractive power including but not limited to a biconcave lens having negative refractive power, or a convex-concave lens or a concave-convex lens having negative refractive power or positive refractive power respectively. The seventh lens L7 may be a glass lens or a plastic lens; the object-side surface S13 and the image-side surface S14 may respectively be a spherical surface, an aspheric surface or a free-form surface, but the present invention is not limited thereto.

For example, the sixth lens L6, the seventh lens L7 and the eighth lens L8 constitute a composite lens. The image-side surface S12 of the sixth lens L6 and the object-side surface S13 of the seventh lens L7 are matched, and the image-side surface S14 of the seventh lens L7 and the object-side surface S15 of the eighth lens L8 are matched. In other words, if the image-side surface(s) S12 and/or S14 are/is toward the object side, the object-side surface(s) S13 and/or S15 are/is toward the object side; if the image-side surface(s) S12 and/or S14 are/is toward the image-forming side, the object-side surface(s) S13 and/or S15 are/is toward the image-forming side.

Moreover, the optical lens OL1, OL2 may further include a stop St and/or a cover C. Besides, an image capturing unit (not shown) may be disposed at the imaging plane I to photoelectric convert for the light beams passed through the optical lens OL1, OL2. The stop St may be arranged between any two of the lenses L1-L9, on the object side of the first lens L1, or between the ninth lens L9 and the imaging plane I of the optical lens OL1, OL2. For example, the stop St may be arranged between the fourth lens L4 and the fifth lens L5, but the present invention is not limited thereto. The cover C may be arranged between the ninth lens L9 and the imaging plane I.

On the other hand, the optical lens OL1, OL2 may further include a filter F. The filter F may be arranged between the ninth lens L9 and the cover C. Furthermore, in another embodiment, the cover C may be combined functions of protecting the image capturing unit and filtering the infrared light beams, and the filter F may be omitted.

FIG. 3A lists each lens parameter of the optical lens OL1 of FIG. 1 according to the present invention. FIG. 3A includes the curvature radius, the thickness, the refractive index, the Abbe number (coefficient of chromatic dispersion), the diameter, the conic constant, and so on of each of the lenses. The surface numbers are sequentially ordered from the object side to the image-forming side. For example, "St" shows the stop St, "S1" shows the object-side surface S1 of the first lens L1, "S2" shows the image-side surface S2 of the first lens L1 . . . "S19" and "S20" respectively show the object-side surface S19 and the image-side surface S20 of the filter F, "S21" and "S22" respectively show the object-side surface S21 and the image-side surface S22 of the cover C, and so on. In addition, the "thickness" shows the distance between an indicated surface and the next adjacent surface/interface close to the image-forming side. For example, the "thickness" of the object-side surface S1 is the distance from the object-side surface S1 to the first lens L1 and the image-side surface S2 of the first lens L1, and the "thickness" of the image-side surface S2 is the distance from the image-side surface S2 to the first lens L1 and the object-side surface S3 of the second lens L2.

FIG. 3B lists coefficients of the mathematic equation of the aspheric surfaces of the optical lens OL1 of FIG. 1. If the object-side surface S5 and the image-side surface S6 of the third lens L3 of the optical lens OL1 are aspheric, and each of the coefficients for the mathematic equation of each aspheric surface may be listed as indicated in FIG. 3B.

Figure 4B:
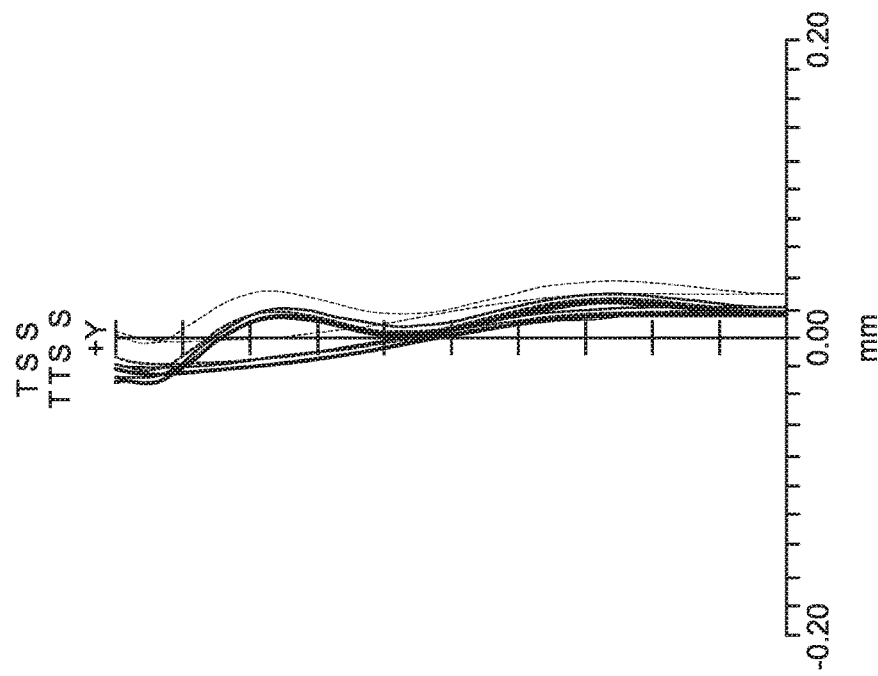
FIG. 4B shows a field curvature chart of the optical lens according to one embodiment of FIG. 1.
Figure 4A:
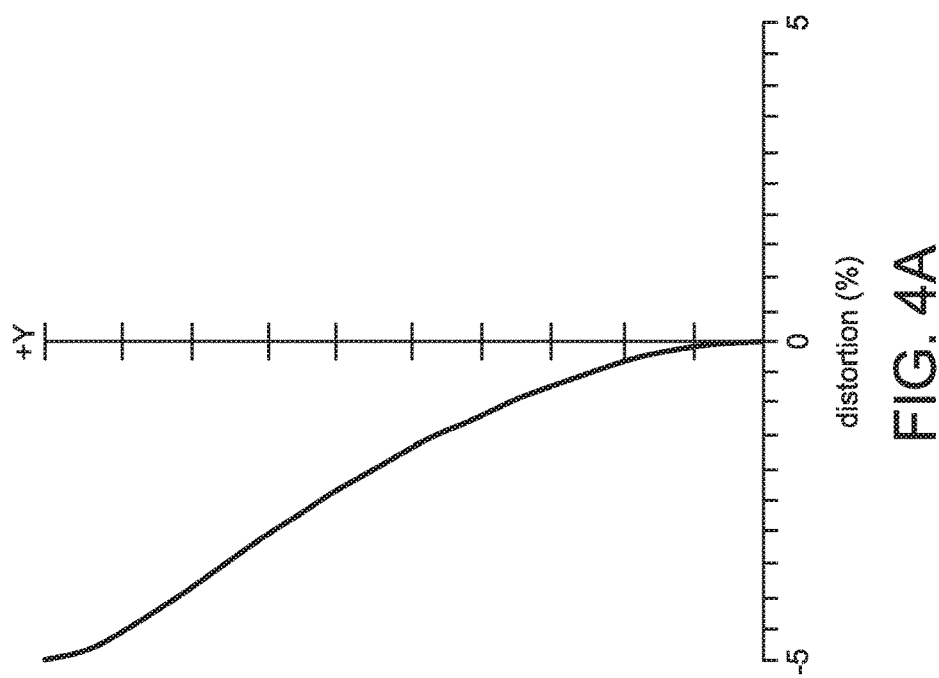
FIG. 4A shows a distortion chart of the optical lens according to one embodiment of FIG. 1.

FIG. 4A shows a distortion chart of the optical lens OL1 according to one embodiment of FIG. 1. As shown in the drawing, the distortion values for light beams are all within favorable ranges.

FIG. 4B shows a field curvature chart of the optical lens OL1 according to one embodiment of FIG. 1. The curves T and S respectively show for the aberration of the optical lens OL1 to the tangential rays and the sagittal rays. As shown in the drawing, the tangential values and the sagittal values of light beams are all within favorable ranges.

Figure 5:
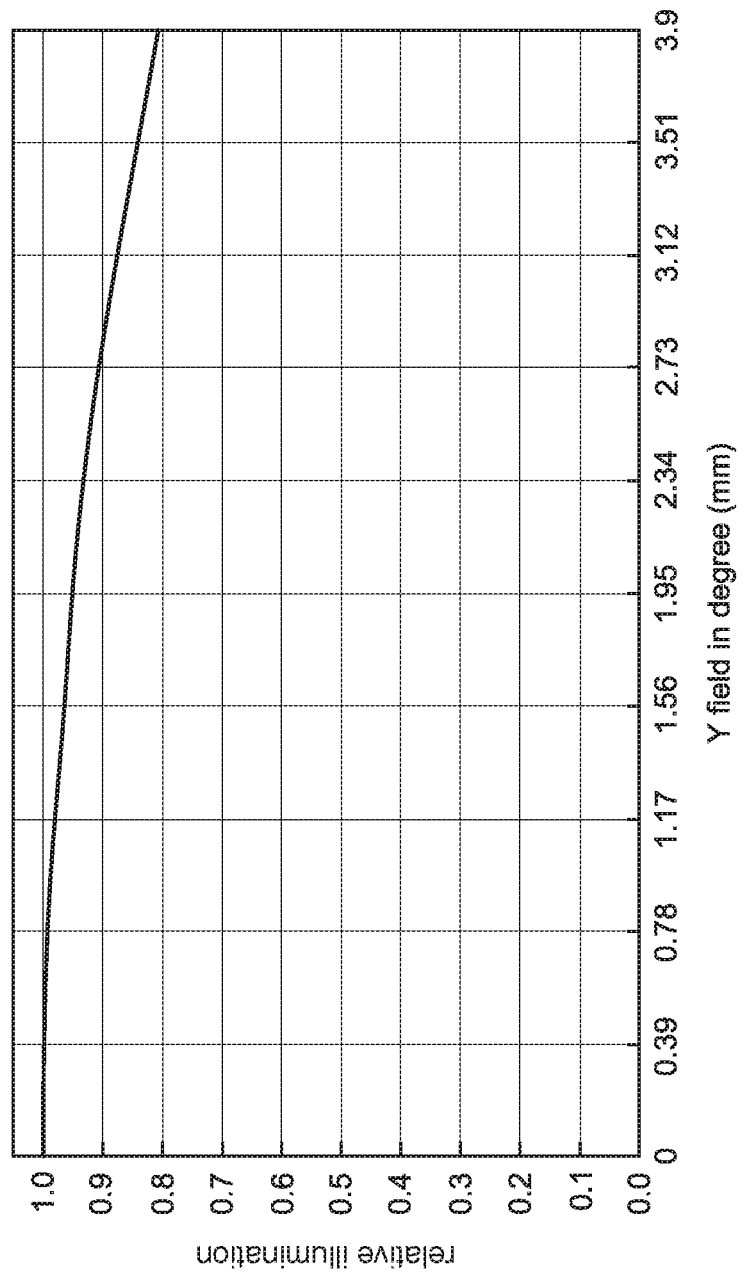
FIG. 5 shows a peripheral illumination chart of the optical lens according to one embodiment of FIG. 1.

FIG. 5 shows a peripheral illumination chart of the optical lens OL1 according to one embodiment of FIG. 1. As shown in FIG. 5, the optical chief ray angle (CRA) may be effectively reduced by the biconvex lens having positive refractive power of the ninth lens L9 of the optical lens OL1, thereby effectively enhancing the peripheral illumination of the optical lens OL1.

Further, as shown in FIG. 2, the optical lens OL2 is similar to the optical lens OL1 and mostly applies the same terms and labels for the same components. The mainly difference from optical lens OL2 and the optical lens OL1 is that: the sixth lens L6 and the seventh lens L7 of the optical lens OL2 constitute a composite lens, and there is a distance between the seventh lens L7 and the eighth lens L8. The image-side surface S12 of the sixth lens L6 and the object-side surface S13 of the seventh lens L7 are matched. If the image-side surface S12 is toward the object side, the object-side surface S13 is toward the object side; if the image-side surface S12 is toward the image-forming side, the object-side surface S13 is toward the image-forming side.

FIG. 6A lists each lens parameter of the optical lens OL2 of FIG. 2, the definition and meaning of which are similar to FIG. 3A.

FIG. 6B lists coefficients of the mathematic equation of the aspheric surfaces of the optical lens OL2 of FIG. 2. If the object-side surface S5 and the image-side surface S6 of the third lens L3 of the optical lens OL2 are aspheric, each of the coefficients for the mathematic equation of each aspheric surface may be listed as indicated in FIG. 6B.

Figure 7:
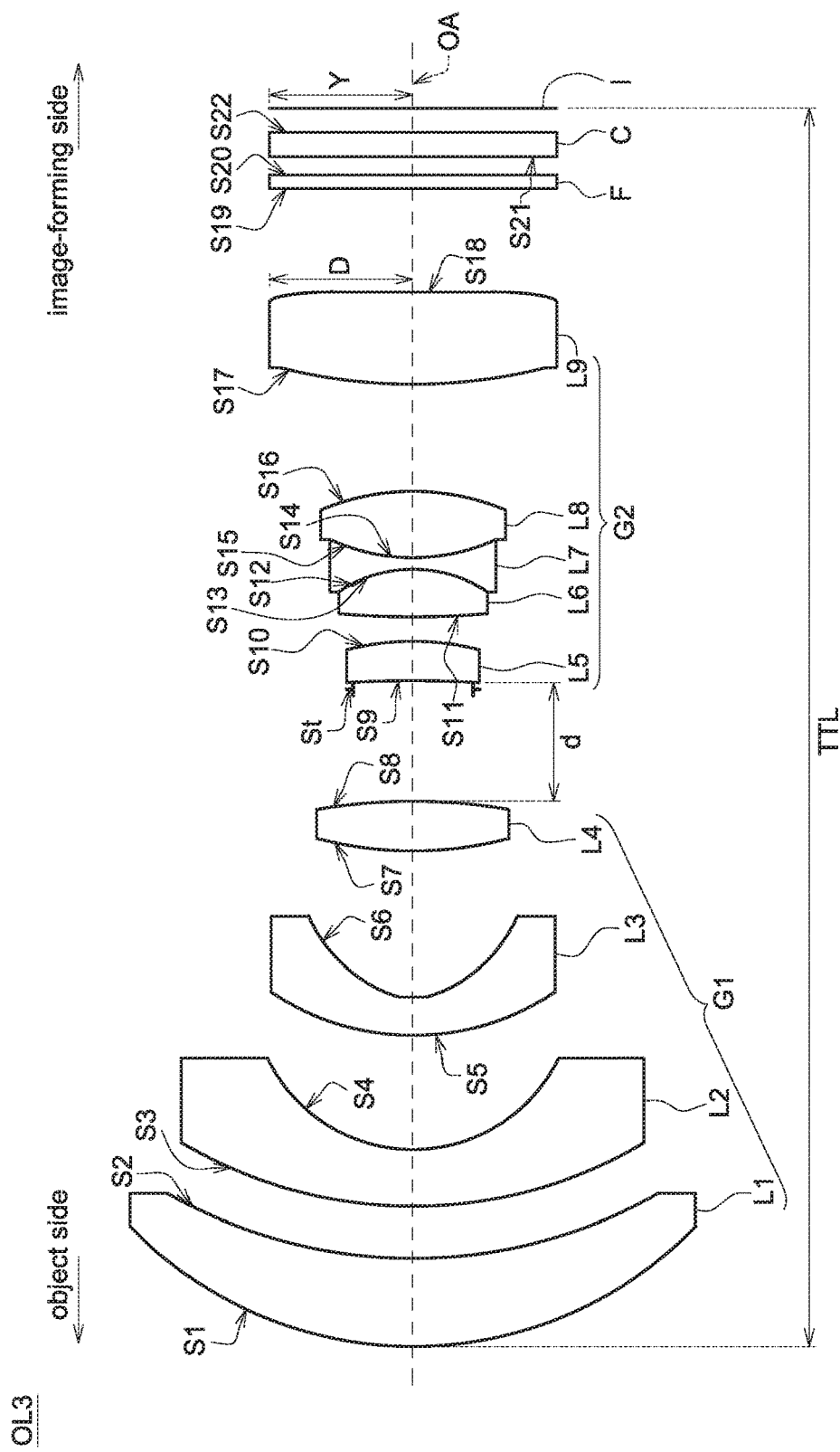
FIG. 7 shows an optical lens according to another embodiment of the present invention.

FIG. 7 shows an optical lens OL3 according to another embodiment of the present invention. FIG. 8A lists each lens parameter of the optical lens OL3 of FIG. 7. As shown in FIG. 7, the optical lens OL3 is similar to the optical lens OL1 and mostly applies the same terms and labels for the same components. The definition and meaning for each lens parameter in FIG. 8A are similar to FIG. 3A.

In one embodiment, the first lens L1, the fourth lens L4 and the ninth lens L9 of the optical lens OL3 may have positive refractive power; the second lens L2 and the third lens L3 may have negative refractive power; the fifth lens L5, the sixth lens L6, the seventh lens L7 and the eighth lens L8 may have positive or negative refractive power respectively.

In one embodiment, the first lens L1, the sixth lens L6, the seventh lens L7 and the eighth lens L8 of the optical lens OL3 may be glass lenses; the second lens L2, the third lens L3, the fourth lens L4, the fifth lens L5 and the ninth lens L9 may be the glass lens(es) and/or the plastic lens(es) respectively.

FIG. 8B lists coefficients of the mathematic equation of the aspheric surfaces of the optical lens OL3 of FIG. 7. In one embodiment, the third lens L3 and the ninth lens L9 of the optical lens OL3 may be aspheric lenses, and the coefficients of the mathematic equation of the aspheric surfaces for the object-side surfaces S5, S17 and the image-side surfaces S6, S18 of the third lens L3 and the ninth lens L9 are shown in FIG. 8B. In addition, the first lens L1, the second lens L2, the fourth lens L4, the fifth lens L5, the sixth lens L6, the seventh lens L7 and the eighth lens L8 are spherical lenses.

FIG. 9 lists optical information of the optical lenses OL1, OL2 and OL3 of FIGS. 3A, 3B, 6A, 6B, 8A and 8B.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical lens comprising:
   a first lens group, in order from an object side to an image-forming side, at least comprising a first lens having positive refractive power, a second lens having negative refractive power, a third lens having negative refractive power and a fourth lens having positive refractive power; and
   a second lens group having positive refractive power comprising a plurality of lenses, and a lens of the second lens group which is closest to the image-forming side has positive refractive power.

2. The optical lens according to claim 1, wherein the lens which is closest to the image-forming side is a biconvex lens.

3. The optical lens according to claim 1, further comprising a focal length F and a length TTL, the length is a distance between an object-side surface of the first lens and an imaging plane, and the optical lens satisfies at least one of the following conditions:
$0 \leq F/TTL$ and $F/TTL \leq 0.25$.

4. The optical lens according to claim 1, further comprising a focal length F and an image height Y, and the optical lens satisfies at least one of the following conditions: $0.8 \leq F/Y$ and $F/Y \leq 1.2$.

5. The optical lens according to claim 1, further comprising a focal length F, and the optical lens satisfies at least one of the following conditions: $0.15 \leq d/F$ and $d/F \leq 0.85$, and d is a distance between the fourth lens and the second lens group.

6. The optical lens according to claim 1, further comprising a field of view FOV, and the optical lens satisfies at least one of the following conditions: $70° \leq FOV$ and $FOV \leq 115°$.

7. The optical lens according to claim 1, further comprising an aperture FNO, a length TTL, a field of view FOV and an image height Y, the length is a distance between an object-side surface of the first lens and an imaging plane, and the optical lens satisfies at least one of the following conditions: $0 \leq (FNO \times TTL)/(FOV \times Y)$ and $(FNO \times TTL)/(FOV \times Y) \leq 0.4$.

8. The optical lens according to claim 1, wherein an object-side surface of the first lens has a first curvature radius R1, an image-side surface of the first lens has a second curvature radius R2, and the optical lens satisfies at least one of the following conditions: $0.8 \leq |R2/R1|$ and $|R2/R1| \leq 2$.

9. The optical lens according to claim 1, wherein an image-side surface of the second lens has a fourth curvature radius R4 and an optical effective diameter $\Phi14$, and the optical lens satisfies at least one of the following conditions: $1.6 \leq \Phi4/R4$ and $\Phi4/R4 \leq 2$.

10. The optical lens according to claim 1, wherein the second lens group, in order from the object side to the image-forming side, at least comprises a fifth lens, a sixth lens, a seventh lens, an eighth lens and a ninth lens; the sixth lens, the seventh lens and the eighth lens constitute a composite lens, or the sixth lens and the seventh lens constitute a composite lens, or the seventh lens and the eighth lens constitute a composite lens.

11. The optical lens according to claim 10, wherein one of the sixth lens, the seventh lens and the eighth lens has negative refractive power, and the other two of the sixth lens, the seventh lens and the eighth lens have positive refractive power.

12. The optical lens according to claim 10, wherein the fifth lens and the ninth lens have positive refractive power, and the composite lens has negative refractive power.

13. The optical lens according to claim 1, further comprising an image height Y, the lens which is closest to the image-forming side of the second lens group has an effective diameter D, and the optical lens satisfies at least one of the following conditions: $0.6 \leq D/Y$ and $D/Y \leq 2.2$.

14. The optical lens according to claim 1, wherein the second lens group, in order from the object side to the image-forming side, at least comprises a fifth lens, a sixth lens, a seventh lens, an eighth lens and a ninth lens, the fourth lens has an Abbe number V4, the ninth lens has an Abbe number V9, and the optical lens satisfies at least one of the following conditions: $35 \leq V4$, $V4 \leq 60$, $50 \leq V9$ and $V9 \leq 85$.

15. The optical lens according to claim 1, wherein the second lens group, in order from the object side to the image-forming side, at least comprises a fifth lens, a sixth lens, a seventh lens, an eighth lens and a ninth lens, the first lens has an Abbe number V1 and a refractive index N1, the second lens has an Abbe number V2 and a refractive index N2, the third lens has an Abbe number V3 and a refractive index N3, the fourth lens has an Abbe number V4 and a refractive index N4, the fifth lens has an Abbe number V5 and a refractive index N5 , the sixth lens has an Abbe number V6 and a refractive index N6 , the seventh lens has an Abbe number V7 and a refractive index N7 , the eighth lens has an Abbe number V8 and a refractive index N8 the ninth lens has an Abbe number V9 and a refractive index N9, and the optical lens satisfies at least one of the following conditions: $N1-N3 \geq 0.1$, $N1-N3>0$, $N2-N3>0.1$, $N2-N3>0$, $N4-N3>0$, $N7-N8>0$, $N7-N6>0$, $N7-N5 \geq 0$, $N5-N6 \geq 0$, $N9-N8>0$, $V2-V1 \geq 0$, $V3-V1 \geq 5$, $V3-V4 \geq 5$, $V8-V9>5$, $V8-V7>5$, $V8-V6>5$, $V8-V5>5$, $V631$ $V7>5$ and $V6-V5>10$.

16. The optical lens according to claim 1, wherein the second lens group, in order from the object side to the image-forming side, at least comprises a fifth lens, a sixth lens, a seventh lens, an eighth lens and a ninth lens, the first lens is a convex-concave lens, the second lens is a convex-concave lens, the third lens is a convex-concave lens or an aspheric lens, the fourth lens is a biconvex lens, the fifth lens is a concave-convex lens, the sixth lens is a biconvex lens, a convex-concave lens or a concave-convex lens, the seventh lens is a biconcave lens, a convex-concave lens or a concave-convex lens, the eighth lens is a biconvex lens, a convex-concave lens or a concave-convex lens, or the ninth lens is a biconvex lens or an aspheric lens.

17. An optical lens comprising:
a first lens group, in order from an object side to an image-forming side, at least comprising a first lens having positive refractive power, a second lens having negative refractive power, a third lens having negative refractive power and a fourth lens having positive refractive power; and
a second lens group, in order from the object side to the image-forming side, at least comprising a composite lens and a lens having positive refractive power.

18. The optical lens according to claim 17, wherein the composite lens consists of two lenses or three lenses.

19. An optical lens, in order from an object side to an image-forming side, at least comprising:
a first lens having positive refractive power;
a second lens having negative refractive power;
a third lens having negative refractive power;
a fourth lens having positive refractive power;
a fifth lens having refractive power;
a sixth lens having refractive power;
a seventh lens having refractive power;
an eighth lens having refractive power; and
a ninth lens having positive refractive power;
wherein the sixth lens, the seventh lens and the eighth lens constitute a composite lens, or the sixth lens and the seventh lens constitute a composite lens, or the seventh lens and the eighth lens constitute a composite lens.

20. The optical lens according to claim 19, wherein one of the sixth lens, the seventh lens and the eighth lens has negative refractive power, and the other two of the sixth lens, the seventh lens and the eighth lens have positive refractive power.

* * * * *